Patented Sept. 14, 1948

2,449,180

UNITED STATES PATENT OFFICE 2,449,180

COMPOSITION OF PHENOL-RUBBER AND RESORCINOL-FORMALDEHYDE

Herman E. Schroeder, Wilmington, Del., assignor to E. I. du Pont de Nemours & Company, Wilmington, Del., a corporation of Delaware No Drawing. Application June 21, 1945, Serial No. 600,839

2 Claims. (Cl. 260—3)

This invention relates to heat-convertible compositions and more particularly to adhesive compositions comprising aldehyde resols.

When rubber is worked on a rubber mill (or related apparatus, such as a Banbury mixer) with about 5% to 55% of its weight of a phenol and particularly an unsubstituted monohydric phenol, such as beta-naphthol, in the presence of a small amount of a special catalyst, for example dihydroxyfluoroboric acid or sulfuric acid, for about 15 minutes at 100° C. whereby from about 1% to about 5% by weight of the phenol, based on the rubber, is chemically combined with the rubber, a material is obtained which is quite unlike rubber and the heretofore known rubber derivatives (including the products known as rubber isomers). The new material, being denser, sinks when placed in water, will not adhere to unvulcanized rubber (J. I. E. C. XXXIII, 389) and, when mixed with rubber on a mill and the mixture made into a thin cement, layers off. This material is prepared as described in U. S. Patent 2,158,530 and is referred to herein and in the claims as "phenol-rubber."

In the construction of many articles, the ultimate in strength and resistance to deformation can be secured only through lamination of various elements, by means of an adhesive, thus forming composite structures. This goal of ultimate strength has not heretofore been achieved in many instances because of the unavailability of suitable adhesives. Typical examples are structures composed of natural or synthetic rubber laminated to regenerated cellulose, steel, aluminum, etc.

It is an object of this invention to provide new thermosetting compositions which are flexible and which give outstanding bond strengths at normal and at elevated temperatures. It is another object to provide aqueous dispersions of the said compositions. It is still another object to provide dispersions of the said compositions in organic solvents. A further object is to provide methods for preparing the said compositions.

The above and other objects of this invention are accomplished by providing compositions comprising blends of phenol-rubber with mononuclear polyhydric phenol/aldehyde resols.

In one preferred embodiment of this invention a solution in an organic solvent of phenol-rubber is blended with a solution of the mononuclear polyhydric phenol/aldehyde resol and the blend homogenized.

In another preferred embodiment of this invention, a dispersion of phenol-rubber in an aqueous medium is blended with an aqueous solution of the mononuclear polyhydric phenol/aldehyde resol and the blend homogenized.

The examples which follow illustrate the principles and diverse embodiments of the invention including modes contemplated for carrying out the same. In the examples, parts are by weight unless otherwise stated.

EXAMPLE I

A phenol-rubber is prepared, in accordance with the procedure described in U. S. Patent 2,158,530, by masticating 3.000 parts of smoked sheet rubber on a mill at 70° C. until it forms a smooth, continuous sheet. A mixture of 1300 parts of a carbon black, sold under the trade name of "Micronex," and 600 parts of phenol is added and thoroughly dispersed. Cooling water is applied to the rolls and a mix of 200 parts of the above carbon black and 67.5 parts of sulfuric acid is added and worked until well dispersed. The rolls are then heated with steam at 116° C. to 125° C. and the product is worked on the mill until it loses its tack and becomes coherent, and is then removed from the rolls and cooled. One hundred fifty parts of zinc oxide is then added and dispersed in the phenol-rubber to neutralize the sulfuric acid. The pliable, rubbery compound thus obtained is tough and possesses a Shore durometer Type A hardness of 63.

Resorcinol-formaldehyde resol is prepared by dissolving 24 parts of paraformaldehyde in 162 parts of normal butanol containing 0.24 part of potassium hydroxide and then adding to this solution, with stirring at 20° C., 30 parts of resorcinol, followed by one part of a 25% solution of phosphoric acid in ethanol.

Two hundred fifty parts of the phenol modified rubber, prepared as described above, is dissolved in 2,250 parts of xylene by heating and stirring. To 40 parts of this solution is added with stirring 8 parts of a 25% solution in normal butanol of the resorcinol-formaldehyde resol, prepared as described above. To the blend is added 2 parts of a 10% solution of hexamethylenetetramine in chloroform. The resulting composition is used as an adhesive in laminating rayon, nylon, and cotton to natural and synthetic rubber as follows:

Weighed strips of square woven rayon, nylon, and cotton fabrics are coated with the above adhesive, the coated strips are heated for from 5 to 30 minutes at 70° C. to 80° C., cooled, and then weighed to determine the amount of adhesive deposited on the cloth. The coated strips are then pressed onto carcass stocks of natural rubber, Buna S[1], and neoprene[2], calendered onto a cotton fabric backing for reenforcement and compounded for vulcanization. The assemblage of carcass and phenol-rubber/thermosetting aldehyde resol coated fabric is placed in a mold and heated at 140° C. to 145° C. until the rubber is vulcanized and the adhesive has heat-converted. Thereafter, the composite is removed from the mold, cooled, and bond strength determined by measuring the pull in pounds per linear inch required to separate the rubber from the adhesive coated fabric. The results are summarized in Table I, as follows:

TABLE I

*Composite articles bonded with phenol-modified rubber adhesives*

| Fabric | Adhesive Composition | Rubber Stock | Adhesive Loading, Per cent | Bond, lbs./in. at— | |
|---|---|---|---|---|---|
| | | | | 25° C. | 100° C. |
| Rayon | None | Rubber | | 2.0 | 1.5 |
| Do | do | Buna S[1] | | 2.0 | 1.7 |
| Do | do | Neoprene[2] | | 2.0 | 1.5 |
| Do | Phenol-Rubber of Ex. 1 | Rubber | 10 | 6–7 | 2 |
| Do | Resorcinol-formaldehyde resin | do | 10 | 4–5 | 4 |
| Do | Adhesive of Ex. 1 | do | 10 | 35 | 39 |
| Do | do | Buna S | 10 | 50 | 45 |
| Do | do | Neoprene | 10 | 30 | 22 |
| Nylon | None | Rubber | | 2.0 | 1.5 |
| Do | do | Buna S | | 2.0 | 2.0 |
| Do | Adhesive of Ex. 1 | Rubber | 12 | 46 | 33 |
| Do | do | Buna S | 13 | 62 | 43 |
| Cotton | None | Rubber | | 18 | |
| Do | do | Buna S | | 17 | |
| Do | Adhesive of Ex. 1 | Rubber | 13 | 42 | 29 |
| Do | do | Buna S | 14 | 46 | 34 |

EXAMPLE II

A series of adhesive compositions, comprising blends of the phenol-rubber of Example I with the aldehyde resols listed below, was prepared in the manner described in Example I, and evaluated in the bonding of natural rubber to rayon. The composition of the blends and the bond strengths obtained, in comparison with phenol-rubber alone and with the individual resins, are listed in Table II.

(1) A bis(4-hydroxyphenyl) propane-formaldehyde resol, prepared as described in U. S. Patent 2,302,557.

(2) Resorcinol-furfural resol, prepared by mixing at room temperature 11 parts of resorcinol, 29 parts of furfural and 40 parts of ethanol.

(3) A phenol-formaldehyde resol, prepared by heating together 600 parts of phenol, 480 parts of 40% aqueous formaldehyde and 9 parts of ammonium chloride for 1.5 hours at 90–95° C., and subsequently separating the water and drying.

(4) Meta-cresol-formaldehyde resol, a commercial product sold under the trade name of "Durez" 175.

(5) Phenol-resorcinol-formaldehyde resol prepared by adding 30 parts of phenol and 30 parts of resorcinol at 20° C. to a solution of 48 parts of paraformaldehyde in 100 parts of n-butanol.

From the data in Tables I and II, it is apparent that the adhesives containing phenol-rubber and a mononuclear dihydric phenol-aldehyde resol, are unexpectedly better in bond strengths than either phenol-rubber alone or rubber alone, or the combination of the same phenol-rubber with either a monohydric phenol-aldehyde resol or a dihydric dinuclear phenol-aldehyde resol.

TABLE II

*Lamination of natural rubber to rayon*

| No. | Rubber Compound | Parts | Thermosetting Resol | Parts |
|---|---|---|---|---|
| 1 | Rubber | | | |
| 2 | Phenol Rubber | | | |
| 3 | do | 10 | Phenol/formaldehyde | 5.0 |
| 4 | do | 10 | Bis (4-hydroxyphenyl) propane/formaldehyde | 5.0 |
| 5 | do | 10 | m-Cresol/formaldehyde | 5.0 |
| 6 | do | 10 | Resorcinol/formaldehyde | 5.0 |
| 7 | do | 10 | do | 5.0 |
| 8 | do | 10 | Resorcinol/furfural | 5.0 |
| 9 | do | 10 | Phenol/resorcinol/formaldehyde | 5.0 |

| No. | Catalyst | Parts | Loading on fabric per cent by Weight | Bond, lbs./in., at— | |
|---|---|---|---|---|---|
| | | | | 25° C. | 100° C. |
| 1 | None | | 10 | 2.0 | 1.5 |
| 2 | | | 10 | 6.0 | 2.0 |
| 3 | | | 10 | 16 | |
| 4 | | | 10 | 30 | 4 |
| 5 | | | 10 | 23 | 4 |
| 6 | | | 12 | 32 | 15 |
| 7 | Hexa[1] | 0.5 | 10 | 50 | 35 |
| 8 | do[1] | 0.5 | 10 | 35 | 25 |
| 9 | do[1] | 0.5 | 15 | 38 | 28 |

[1] Hexa = Hexamethylenetetramine.

EXAMPLE III

A batch of beta-naphthol rubber is prepared according to Example X in U. S. Patent 2,158,530. Two hundred fifty parts of this beta-naphthol-rubber is dissolved in 2250 parts of xylene by heating and stirring. A blend is prepared by adding to 40 parts of the xylene solution with stirring, 8 parts of a 25% solution in n-butanol of a resorcinol-formaldehyde resol. The blend is tested as an adhesive for rayon in the manner described in Example I. The bond strength at 25° C. at a fabric loading of 10% is 38 lbs./in. The bond strength at the same loading weight for beta-naphthol-rubber alone at 25° C. is 10.8 lbs./in.

EXAMPLE IV

To 100 parts of smoked sheet rubber is added 30 parts of a semi-reinforcing carbon black sold under the trade name of "Gastex" and 15 parts of phenol and the mixture is masticated on a mill at 70° C. until it forms a smooth, continuous sheet. Cooling water is applied to the rolls and there is added to the mix 2.1 parts of sulfuric acid of 1.84 specific gravity and the mixture worked on the mill until it is homogeneous. The rolls are then heated with steam at 115° to 125° C., the product worked on the mill until it loses its tack and becomes coherent, then removed from the rolls, and cooled.

Two hundred parts of the phenol-rubber product, prepared as described above, are masticated on a water-cooled, two-roll mill, until the product forms a smooth running band. This material is transferred to a heavy-duty internal mixer of the Werner-Pfleiderer type and worked with 100 parts of xylene until the product is a smooth dough, free of lumps. One hundred parts of a 10% aqueous solution of high viscosity 85–88% hydrolyzed polyvinyl acetate (saponification No. 137–157, viscosity 35–40 centipoises as a 4% aqueous solution at 20° C.) is then added in one portion, forming a thick water-in-rubber emulsion.

---

[1] A 75/25 butadiene-styrene interpolymer, prepared according to U. S. Patent 1,938,731.
[2] A 2-chloro-1, 3-butadiene polymer, prepared according to U. S. Patent 2,264,173.

As mastication progresses, the mass grows stiffer, drier, and warmer and finally inverts to a smooth paste in which water is the continuous phase. Stirring is continued for about one hour, after which the product is carefully diluted by addition of 200 parts of water as rapidly as the batch takes it up without breaking. The resulting emulsion, when discharged from the mixer, is found to consist largely of particles of 1-5 microns in diameter. The same results can be obtained by slow, careful addition of the hydrolyzed polyvinyl acetate solution to the rubber dough.

EXAMPLE V

To 160 parts of the phenol-rubber, prepared as described in Example IV, is added 130 parts of xylene and 150 parts of a 10% solution of the hydrolyzed polyvinyl acetate of Example IV containing, in addition, 3 parts of sodium salt of a sulfonated naphthalene/formaldehyde condensation product sold under the trade name "Daxad 11" and the mixture worked in an internal mixer of the Werner-Pfleiderer type until a homogeneous dispersion is obtained. The dispersion is then diluted to 25% rubber solids and removed from the mill. The particles are of about 2 microns in diameter.

EXAMPLE VI

Two hundred parts of phenol-rubber, prepared as described in Example IV, is worked on a cold two-roll rubber mill until a smooth running band is obtained. To the material is then added 16 parts of xylene and 16 parts of oleic acid. To the plastic mass is then added 60 parts of a 10% aqueous solution of the hydrolyzed polyvinyl acetate of Example IV as rapidly as the batch will take it up without breaking. The stiff mass is then worked thoroughly in an internal mixer of the Werner-Pfleiderer type and thereafter there are added 15 parts of 28% ammonium hydroxide solution in two equal portions. The batch is thoroughly blended after the addition of the first portion of the ammonium hydroxide and the remainder of the ammonium hydroxide thereafter added, whereupon inversion of the dispersion occurs. The rubber-in-water paste thus obtained is thereafter diluted with water to about 40% rubber solids. The emulsion contains particles which vary from 0.5 to 1 micron in diameter.

EXAMPLE VII

To 40 parts of the dispersion, formed as in the second part of Example IV, there is added, with efficient stirring, a solution of 2 parts of resorcinol, 4 parts of 37% aqueous formaldehyde solution, and 0.4 part of hexamethylenetetramine in 30 parts of water. The blend is applied to weighed strips of nylon fabric and the coated fabric is then bonded to natural rubber and to an 75/25 butadiene/styrene interpolymer in the manner described in Example I. A 10% loading of adhesive is found to afford a bond to rubber of 38.0 lbs./in. at 25° C., while at 100° C. the bond is stronger than the rubber stock itself. Similarly, with the 75/25 butadiene/styrene interpolymer, the bond strength is 90 lbs./in. at 25° C. and the bond at 100° C. is stronger than the rubber stock.

EXAMPLE VIII

To 40 parts of the dispersion, formed as in Example V, there is added a solution of 1.5 parts of resorcinol, 3 parts of 37% aqueous formaldehyde and 0.27 part of hexamethylenetetramine in 33 cc. of water and the mixture homogenized by stirring. When applied to nylon at a 12% loading weight and cured in a manner similar to Example I, the bond strengths to rubber and to an 75/25 butadiene/styrene interpolymer are 30 and 67 lbs./in., respectively, at 25° C.

EXAMPLE IX

To 20 parts of the dispersion, prepared in Example VI, containing in addition 0.01 part of sodium "Lorol" sulfate, there is added with stirring a solution of 1.1 part of resorcinol, 1 part of 37% formaldehyde, 0.15 part of hexamethylenetetramine, 0.2 part of 10% aqueous sodium hydroxide, and 0.15 part of sodium "Lorol" sulfate in 10 parts of water. When evaluated as described in Example VIII, this composition affords bond strengths between nylon and a 75/25 butadiene/styrene interpolymer of 43 lbs./in. at 25° C.

In the practice of this invention, any phenol-rubber prepared according to the teachings in U. S. Patent 2,158,530 can be used. The preferred products, however, are those prepared by treating natural rubber with a monohydric phenol, free of substituents other than halogen or hydrocarbon radicals, on a mill or in an internal mixer at elevated temperatures in the presence of an acidic catalyst, preferably sulfuric acid as illustrated by the foregoing examples. For certain applications, it is preferred that the phenol-rubber be of the pliable type and these are obtained according to the teachings in U. S. Patent 2,158,530, by carefully controlling the amount of catalyst, temperature, and amount of phenol. The preferred phenol-rubber of this type is obtained by reacting 100 parts of rubber with 10-30 parts of phenol and 1-3 parts of concentrated sulfuric acid at 100° C. to 120° C.

In place of the specific aldehyde resols of the examples, there can be used any thermosetting aldehyde resol. By "thermosetting aldehyde resol" is meant any condensation product of an aldehyde with a monomeric compound selected from the class of mononuclear polyhydric phenols which, under the influence of heat, become permanently infusible.

In place of formaldehyde there can be used other aldehydes, and materials which, under the conditions of reaction liberate formaldehyde in the preparation of the thermosetting aldehyde resols. Examples of such materials are paraformaldehyde, hexamethylenetetramine, and 1,3,5-trioxane. Other operable aldehydes are acetaldehyde, butyraldehyde, choral, furfural, benzaldehyde and the like.

The thermosetting aldehyde resols can be made from polyhydric phenols such as hydroquinone, catechol, pyrogallol, phloroglucinol, orcinol, and the like. The dihydric mononuclear phenols are preferred because thermosetting aldehyde resols made therewith yield with phenol-rubber, adhesives showing particularly good bond strengths at elevated temperatures.

The preferred compositions for use as adhesives are those containing from 25 to 90% of phenol-rubber by weight, based on total solids. Percentages outside this range, as from 5 to 95%, can be used, however, especially in applications where exceptionally high bond strengths are not critical. The phenol-rubber may be merely mixed with the aldehyde resol and applied in the form of the solid blend, or it may be applied in the form of a dispersion in either an organic solvent or an aqueous medium. The use of aqueous phenol-rubber dispersions has been found particularly advantageous for reasons of efficiency, economy, and safety.

While many surface active agents may be effective in the formation of aqueous phenol-rubber dispersions, poly-vinyl alcohols, i. e., products obtained by hydrolysis of polyvinyl acetate, are especially preferred since they give dispersions of excellent stability, particularly in the presence of phenolic resins. The polyvinyl alcohol may be employed as the sole dispersing agent or used in conjunction with other auxiliary dispersing agents such as alkali metal or amine soaps, aliphatic sulphates and sulfonates, sulfonated naphthalene-formaldehyde products, etc.

Polyvinyl alcohol has no deleterious effects on the adhesive qualities of the thermosetting composition of this invention but is particularly effective in giving adhesives of exceptionally high bond strengths. This effectiveness is believed to be due in part to the fact that it is a nonionic dispersing agent and hence, it will tolerate the addition of small amounts of acids, bases, phenolic condensation products or cation-active, anion-active type, or nonionic type dispersing agents. The properties of the finished dispersions may, therefore, be varied by the addition of small amounts of such other dispersing agents.

Although polyvinyl alcohols of various types may be used, the most effective are those products of medium to high viscosity which are derived by hydrolyzing up to 90% of the acetate groups from polyvinyl acetate. The preferred concentration of polyvinyl alcohol in the dispersion is from 3 to 12% based on the rubber solids.

It is possible to obtain a phenol-rubber dispersion without the use of a plasticizer such as a volatile organic solvent, e. g., xylene. However, in view of the exceedingly tough nature of the phenol-rubber, it has been found preferable to employ a moderate amount of a volatile organic solvent such as xylene. The softener or plasticizer should be sufficiently volatile to evaporate on drying since its presence in the laminated article leads to weakness in the adhesive bond, particularly at elevated temperatures.

In the lamination of nylon and rayon to natural and synthetic rubbers, best results are obtained with aldehyde-mononuclear polyhydric phenol resols in which the weight ratio of aldehyde to phenol varies from 4:1 to 1.5:1. These compositions, therefore, constitute a preferred embodiment of this invention.

To the compositions of this invention can be added, if desired, any of the ingredients usually used in compounding rubber, e. g., pigments, fillers, vulcanizing agents, peptizers, softeners and antioxidants.

I claim:

1. A composition comprising a blend of a phenol-rubber and a heat-convertible resorcinol-formaldehyde resol, the phenol-rubber constituting 25% to 90% of the blend; the phenol-rubber being a reaction product of rubber and phenol containing 1% to 5% of the phenol chemically combined with the rubber, and the resol being the condensation product of resorcinol and formaldehyde solely.

2. An aqueous dispersion comprising water, a blend of a phenol-rubber and a heat-convertible resorcinol-formaldehyde resol, the phenol-rubber constituting 25% to 90% of the blend, and, as a dispersing agent, a polyvinyl alcohol; the phenol-rubber being a reaction product of rubber and phenol containing 1% to 5% of the phenol chemically combined with the rubber, and the resol being the condensation product of resorcinol and formaldehyde solely.

HERMAN E. SCHROEDER.

REFERENCES CITED

The following references are of record in the file of this patent:

UNITED STATES PATENTS

| Number | Name | Date |
| --- | --- | --- |
| 1,970,835 | Benner | Aug. 21, 1934 |
| 2,072,508 | Mahlman | Mar. 2, 1937 |
| 2,128,635 | Charch et al. | Aug. 30, 1938 |
| 2,296,427 | Daniel et al. | Sept. 22, 1942 |
| 2,300,367 | Harmon | Oct. 27, 1942 |
| 2,343,551 | Harkins | Mar. 7, 1944 |
| 2,345,597 | Harmon | Apr. 4, 1944 |

OTHER REFERENCES

"PVA Polyvinyl Alcohol Properties and Uses," pages 1 and 6, pub. 1940 by R. H. Chem. Dept., Du Pont, Wilmington, Del.